(12) United States Patent
Xu et al.

(10) Patent No.: US 12,671,922 B2
(45) Date of Patent: Jun. 30, 2026

(54) DATA SERVER SYSTEM

(71) Applicants: SQ TECHNOLOGY (SHANGHAI) CORPORATION, Shanghai (CN); INVENTEC CORPORATION, Taipei City (TW)

(72) Inventors: Li Xu, Shanghai (CN); Chao Chen, Shanghai (CN); Chieh Han Yang, Taipei City (TW); Hong-Chou Lin, Taipei City (TW); Yu-Fan Chen, Taipei City (TW)

(73) Assignees: SQ TECHNOLOGY(SHANGHAI) CORPORATION, Shanghai (CN); INVENTEC CORPORATION, Taipei City (TW)

( * ) Notice: Subject to any disclaimer, the term of this patent is extended or adjusted under 35 U.S.C. 154(b) by 279 days.

(21) Appl. No.: 18/668,216

(22) Filed: May 19, 2024

(65) Prior Publication Data

US 2025/0287127 A1     Sep. 11, 2025

(30) Foreign Application Priority Data

Mar. 7, 2024     (CN) .......................... 202410263388.8

(51) Int. Cl.
*H04Q 11/00*          (2006.01)
*H04B 10/40*          (2013.01)

(52) U.S. Cl.
CPC ......... *H04Q 11/0066* (2013.01); *H04B 10/40* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 7,606,228 | B2 * | 10/2009 | Park | H04L 61/00 |
| | | | | 370/466 |
| 7,907,630 | B1 * | 3/2011 | Bicknell | H04L 12/4625 |
| | | | | 370/467 |
| 8,514,877 | B2 * | 8/2013 | Aloni | H04L 49/352 |
| | | | | 370/546 |
| 8,842,688 | B2 * | 9/2014 | Vahdat | H04L 49/40 |
| | | | | 370/256 |
| 9,197,368 | B2 * | 11/2015 | Ghiasi | H04L 1/0063 |
| 9,438,535 | B2 * | 9/2016 | Aloni | H04L 49/352 |
| 9,743,386 | B2 * | 8/2017 | Petrick | H04W 72/04 |

(Continued)

*Primary Examiner* — Jai M Lee
(74) *Attorney, Agent, or Firm* — Maschoff Brennan

(57) ABSTRACT

A data server system includes a central processing unit (CPU) and a baseboard management controller (BMC) disposed on a motherboard, an Ethernet switch, a plurality of processor nodes, a first bus, a second bus and a first optical transceiver disposed on a baseboard, and a second optical transceiver, a third optical transceiver and a physical layer chip (PHY) disposed on an optical module board. The BMC is connected to the CPU. The Ethernet switch is connected to the CPU and the BMC. The processor nodes are connected to the Ethernet switch and the CPU. The first and second buses are connected to the CPU and the processor nodes. The first optical transceiver is connected to the Ethernet switch. The second optical transceiver is connected to the first optical transceiver. The PHY is connected to the second optical transceiver. The third optical transceiver is connected to the PHY.

10 Claims, 6 Drawing Sheets

(56)         References Cited

U.S. PATENT DOCUMENTS 10,419,227  B2 *    9/2019  Large ................... G06F 13/4286
10,924,324  B2 *    2/2021  Rivaud .................... H04L 49/30
11,809,364  B2 *   11/2023  Yang ................... G06F 13/4282

* cited by examiner

DATA SERVER SYSTEM

CROSS-REFERENCE TO RELATED APPLICATIONS

This non-provisional application claims priority under 35 U.S.C. § 119(a) on Patent Application No(s). 202410263388.8 filed in China on Mar. 7, 2024, the entire contents of which are hereby incorporated by reference.

BACKGROUND

1. Technical Field

This disclosure relates to a data server system.

2. Related Art

In response to the current extended business model of online short video platforms, needs for video transcoding and gaming processing are rising. One of the business models is to provide high-definition video transcoding marketing products, which are spread through short video platforms to attract clients' interest in purchasing products. Another business model is to provide real-time processing of online games and allow online users to enjoy online gaming platform services. In order to meet the needs of this online platform, it is necessary to provide a server system capable of processing large amounts of data.

SUMMARY

Accordingly, this disclosure provides a data server system.

According to one or more embodiment of this disclosure, a data server system includes a central processing unit (CPU) and a baseboard management controller (BMC) disposed on a motherboard, an Ethernet switch, a plurality of processor nodes, a first bus, a second bus and a first optical transceiver disposed on a baseboard, and a second optical transceiver, a third optical transceiver and a physical layer chip (PHY) disposed on an optical module board. The BMC is connected to the CPU. The Ethernet switch is connected to the CPU and the BMC. The processor nodes are connected to the Ethernet switch and the CPU. The first and second buses are connected to the CPU and the processor nodes. The first optical transceiver is connected to the Ethernet switch. The second optical transceiver is connected to the first optical transceiver. The PHY is connected to the second optical transceiver. The third optical transceiver is connected to the PHY.

In view of the above description, the data server system of the present disclosure receives and transmits a large amount of data through optical transceivers, and uses the Ethernet switch and the first and second buses as the data transmission interfaces between the CPU and the processor nodes. The data server system can improve the data storage density and data processing ability of the server, and allow users to instantly enjoy the big data services of the online short video platform and online gaming platform.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
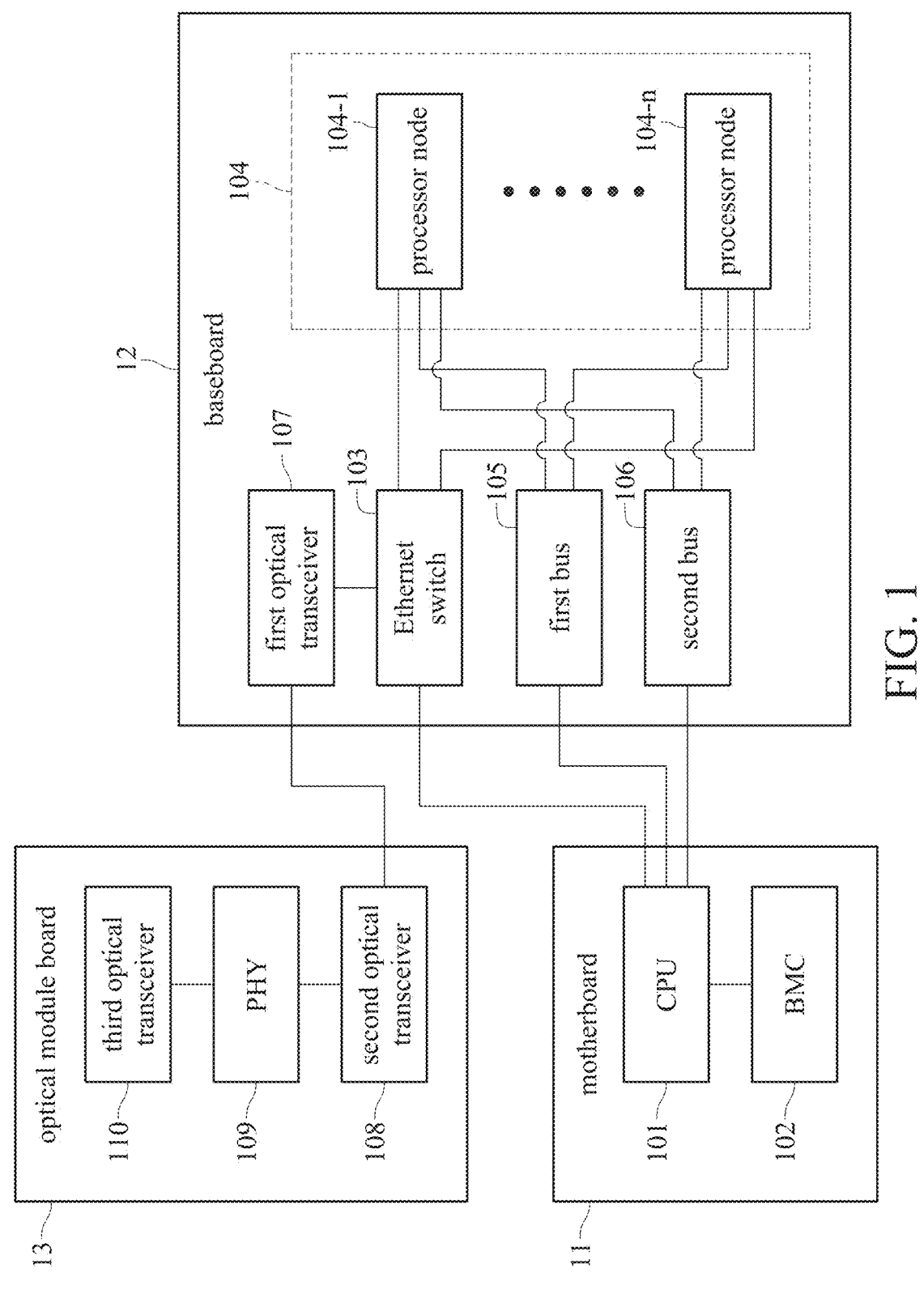
FIG. 1 is a block diagram of a data server system according to an embodiment of the present disclosure.

Please refer to FIG. 1 which is a block diagram of a data server system according to an embodiment of the present disclosure. As shown in FIG. 1, a data server system 1 includes a central processing unit (CPU) 101 and a baseboard management controller (BMC) 102 disposed on a motherboard 11, an Ethernet switch 103, a plurality of processor nodes 104, a first bus 105, a second bus 106 and a first optical transceiver 107 disposed on a baseboard 12, and a second optical transceiver 108, a physical layer (PHY) chip 109 and a third optical transceiver 110 disposed on an optical module board 13. The BMC 102 is connected to the CPU 101. The Ethernet switch 103 is connected to the CPU 101 and the BMC 102. The processor nodes 104 are connected to the Ethernet switch 103 and the CPU 101. The first and second buses 105, 106 are connected to the CPU 101 and the processor nodes 104. The first optical transceiver 107 is connected to the Ethernet switch 103. The second optical transceiver 108 is connected to the first optical transceiver 107. The PHY chip 109 is connected to the second optical transceiver 108. The third optical transceiver 110 is connected to the PHY chip 109.

For example, the central processing unit 101 may be the D2775 chip from Intel Corporation, or the data server system 1 may also use other high-performance processors that can process big data, and the present disclosure is not limited thereto. The BMC 102 may be, for example, the AST2600 chip from ASPEED Corporation, and is configured to perform server management processing procedures, or the data server system 1 may also use other BMC. The CPU 101 and the BCM 102 may be connected to each other based on various connector specifications, such as PCIe, USB, UART, NCSI, etc. The Ethernet switch 103 may include a plurality of data transmission chips and is configured as the main data transmission interface between the motherboard 11, the baseboard 12 and the optical module board 13. The Ethernet switch 103 and the CPU 101 may be connected to each other based on various connector specifications, such as PCIe, CAUI, etc. The Ethernet switch 103 and each of the plurality of processor nodes 104-1 to 104-*n* may be connected to each other based on a connector specification for 2.5 GBaseT. The Ethernet switch 103 and the first optical transceiver 107 may be connected to each other based on a connector specification for 100 G CAUI.

Each of the plurality of processor nodes 104 may be a processing unit, such as a QCS8550 chip from Qualcomm Corporation, or the data server system 1 may also use other high-performance processors that can process big data, and the present disclosure is not limited thereto. In one embodiment, the number of processor nodes 104-1 to 104-*n* may be 240, and every four of the processor nodes 104-1 to 104-*n* may be disposed on a computing card (POD card), and each POD card (60 cards in total) may support hot-plugging function. Specifically, each POD card may be installed in a slot of the computing card base, and the hot-plugging function of each POD card may be implemented through the golden finger mechanism design and related line protection mechanisms, so as to support online hot-plugging operation mode.

The first bus 105 and the second bus 106 may be, for example, a PI7C9×2 G608GP switch based on the PCIe connector specification. The first bus 105 may be connected to each processor node 104 through a PCIe-to-UART adapter. The second bus 106 may be connected to each processor node 104 through a PCIe-to-USB 3.0 adapter. The first and second optical transceivers 107 and 108 may be, for example, Quad Small Form-factor Pluggable (QSFP) transceivers and support a 100 G data transmission rate. The third optical transceiver 110 may include a Dual Small Form-factor Pluggable (DSFP) transceiver and a QSFP transceiver, and support a 100 G data transmission rate. In particular, a set of optical transceivers may include two optical transceiver components. The PHY CHIP 109 may be, for example, the BCM81358 chip from Broadcom Corporation, which is a low-power component with retiming and equalization function.

Through the configuration described above, the 240 processor nodes may transmit data through the 2.5 G Base-T network interface, and these 240 channels of 2.5 G Base-T are aggregated into two 100 G upstream optical transmission interfaces through a two-level Ethernet switch. This configuration may support connection to each processor node through two UARTs, wherein the main UART uses USB-to-UART adapter, and the backup UART uses PCIe-to-UART adapter and is switched by a complex programmable logic device multiplexer (CPLD MUX), which is a backup design solution for improving reliability of system management. This configuration also supports connection to each processor node through USB3.0 connector which enables firmware upgrade of each processor node.

Figure 2:
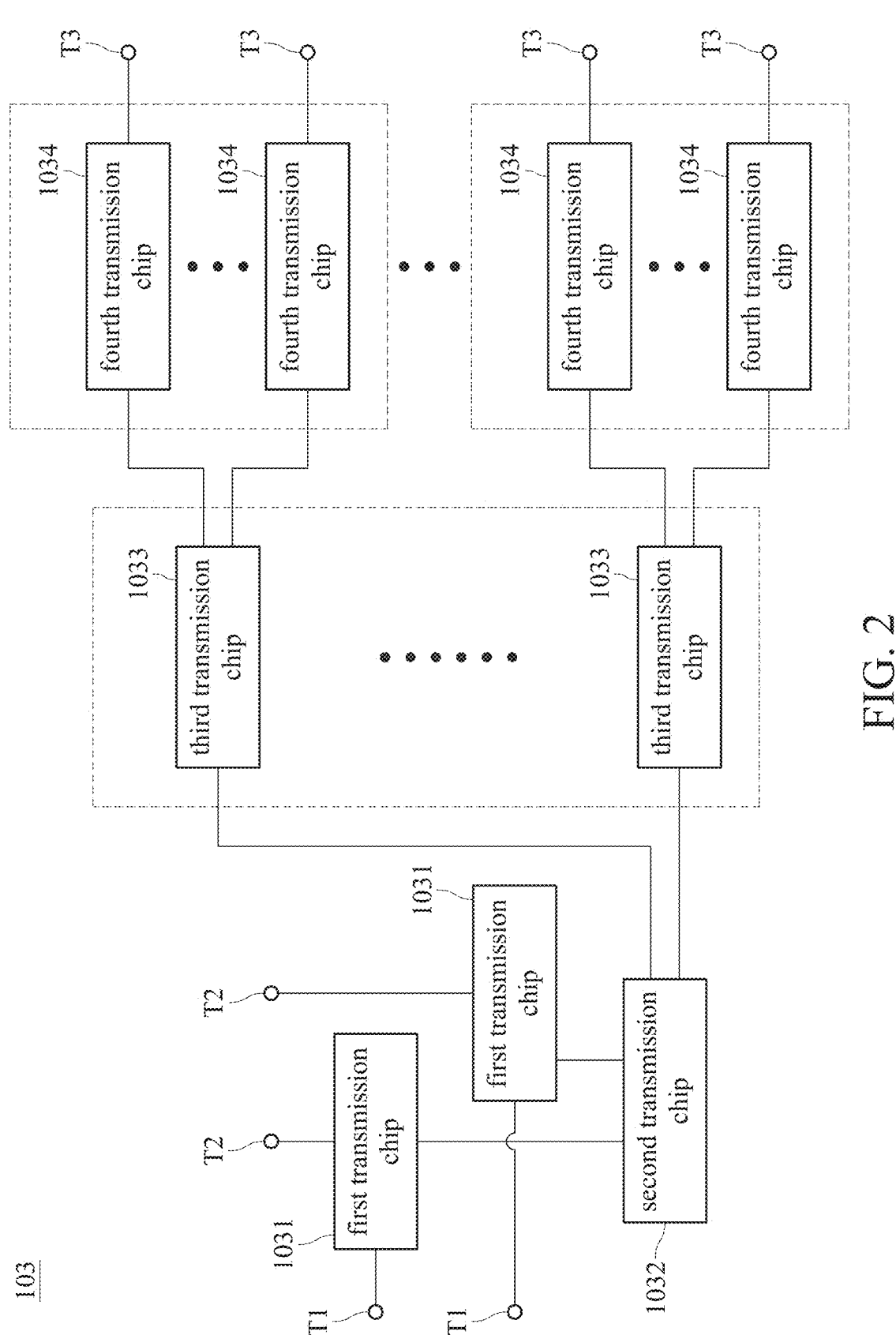
FIG. 2 is a schematic diagram of the internal architecture of an Ethernet switch of a data server system according to an embodiment of the present disclosure.

Please refer to FIG. 2 along with FIG. 1, FIG. 2 is a schematic diagram of the internal architecture of an Ethernet switch of a data server system according to an embodiment of the present disclosure. As shown in FIG. 2, the Ethernet switch 103 of this embodiment may include two first transmission chips 1031, a second transmission chip 1032, a plurality of third transmission chips 1033 and a plurality of fourth transmission chips 1034. The two first transmission chips 1031 may be connected to the CPU 101 through the first terminal T1 and connected to the first optical transceiver 107 through the second terminal T2. The second transmission chip 1032 is connected to the two first transmission chips 1031. The plurality of third transmission chips 1033 are connected to the second transmission chip 1032. The plurality of fourth transmission chips 1034 are connected to the plurality of third transmission chips 1033, and connected to the plurality of processor nodes 104 through the third terminal T3.

In the present embodiment, the first transmission chip 1031 may be the BCM81381 chip from Broadcom Corporation, the second transmission chip 1032 may be the BCM56771 chip from Broadcom Corporation, the third transmission chip 1033 may be the BCM56072 chip from Broadcom Corporation, the fourth transmission chip 1034 may be the BCM54908E chip from Broadcom Corporation. The first transmission chips 1031 and the second transmission chip 1032 may be connected based on the CAUI connector specification, and the first transmission chips 1031 and the second transmission chip 1032 may support a 100 G data transmission rate. The second transmission chip 1032 and the third transmission chips 1033 may be connected based on the Base-KR4 connector specification, and the second transmission chip 1032 and the third transmission chips 1033 may support a 100 G data transmission rate. The third transmission chips 1033 and the fourth transmission chips 1034 may be connected based on the QXGMII connector specification, and the third transmission chips 1033 and the fourth transmission chips 1034 may support a 100 G data transmission rate. Furthermore, in the present embodiment, the number of third transmission chips 1033 may be 5, the number of fourth transmission chips may be 30, and the number of processor nodes 104 may be 240. That is, the second transmission chip 1032 may be connected to 5 third transmission chips 1033, each third transmission chip 1033 may be connected to 6 fourth transmission chips 1034, and each fourth transmission chip 1034 may be connected to 8 processor nodes 104. In addition, the data server system of the present embodiment may include a plurality of adapting components. These adapting components are connected to the plurality of processor nodes 104 through Base-T ports and connected to the fourth transmission chip 1034 of the Ethernet switch 103 through PCIe ports.

The PCIe port of each processor node is converted into a 2.5 GBase-T Ethernet link into the system through Intel's Ethernet controller 1226. The system uses thirty BCM54908E to convert each eight 2.5 GBase-T into 2-channels 10 G QXGMII, and convert into 5-way 100 G Base-KR by using 5 BCM56072, and then aggregate into two 100 G uplink ports by using BCM56771. The two 100 G uplink ports of the system are connected to the optical module board through active optical cables, and the BCM81358 is used for retiming/gearbox to support QSFP or DSFP. The system uses two BCM81381 to implement normal mode (Normal Mode) for 100 G dual uplinks; and uses two BCM81381 to implement multiplexing mode (MUX mode) for dual-port preboot execution Environment (PXE).

Figure 3:
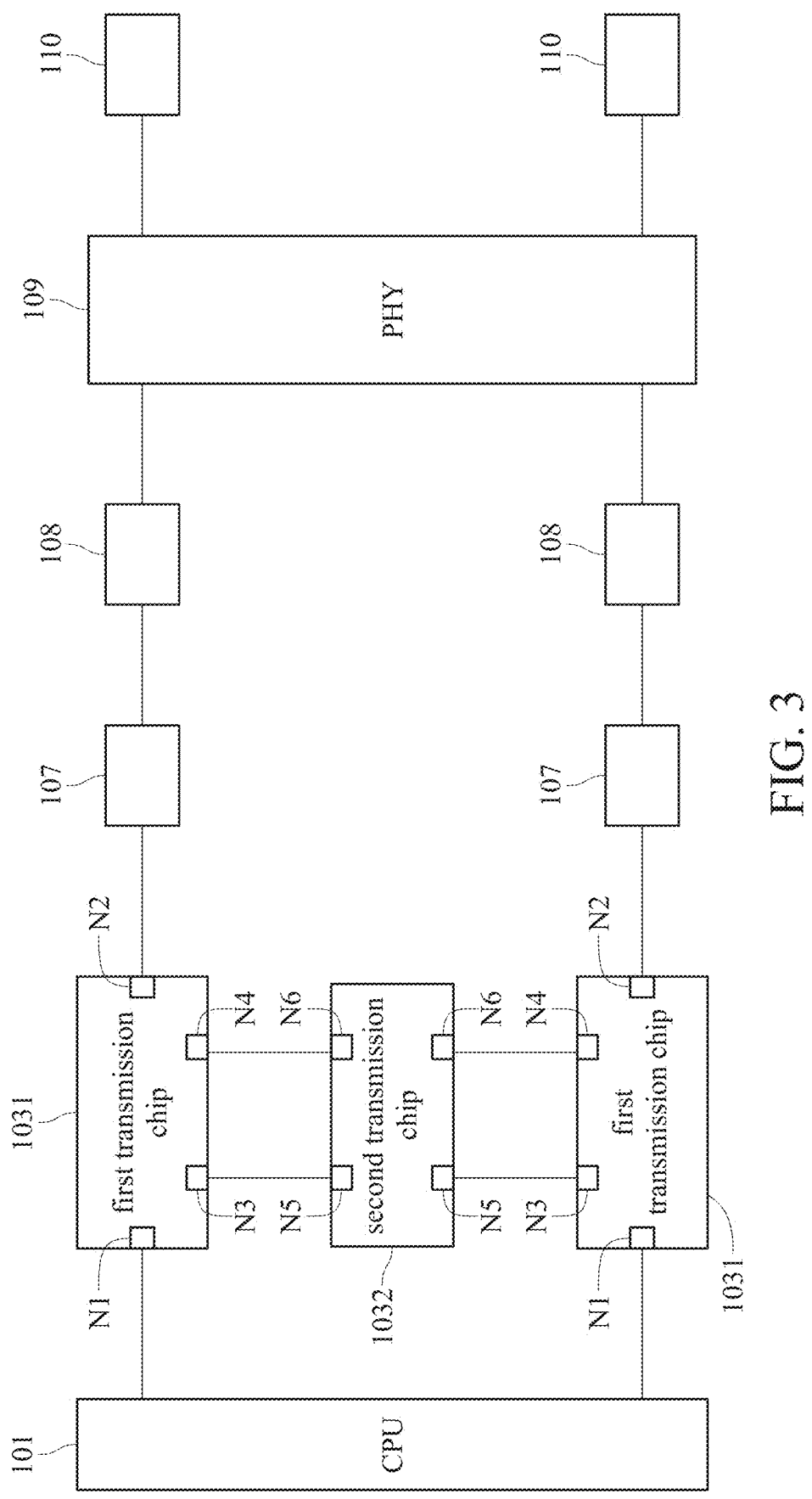
FIG. 3 shows the signal connection relationship between the first and second transmission chips in different modes of the data server system according to an embodiment of the present disclosure.

Please refer to FIG. 3 along with FIG. 1 and FIG. 2, FIG. 3 shows the signal connection relationship between the first and second transmission chips in different modes of the data server system according to an embodiment of the present disclosure. As shown in FIG. 3, the two first transmission chips 1031 support 100 G data transmission rate, and are configured to be switched to a first mode or a second mode under the control of the BMC 102. In the first mode, the CPU 101 may directly receive the signal from the first optical transceivers 107 through the first node N1 and the second node N2 of the two first transmission chips 1031. In the second mode, the CPU 101 receives the signal from the first optical transceivers 107 through the first node N1 and the third node N3 of the two first transmission chips 1031 and the fifth node N5 of the second transmission chip 1032. That is, in the first mode, the signal received from the third optical transceiver 110 is transmitted to the first optical transceiver 107 through the PHY chip 109 and the second optical transceiver 108, and transmitted to the CPU 101 through the second node N2 and the first node N1 of the first transmission chip 1031. In the second mode, the signal received from the third optical transceiver 110 is transmitted to the first optical transceiver 107 through the PHY chip 109 and the second optical transceiver 108, and transmitted to the second transmission chip 1032 (through the sixth node N6) through the second node N2 and the fourth node N4 of the first transmission chip 1031, and then transmitted to the CPU 101 through the fifth node N5 of the second transmission chip 1032 and the third node N3 and the first node N1 of the first transmission chip 1031. The first mode corresponds to the Normal mode described above, and the second mode corresponds to the MUX mode.

Figure 4:
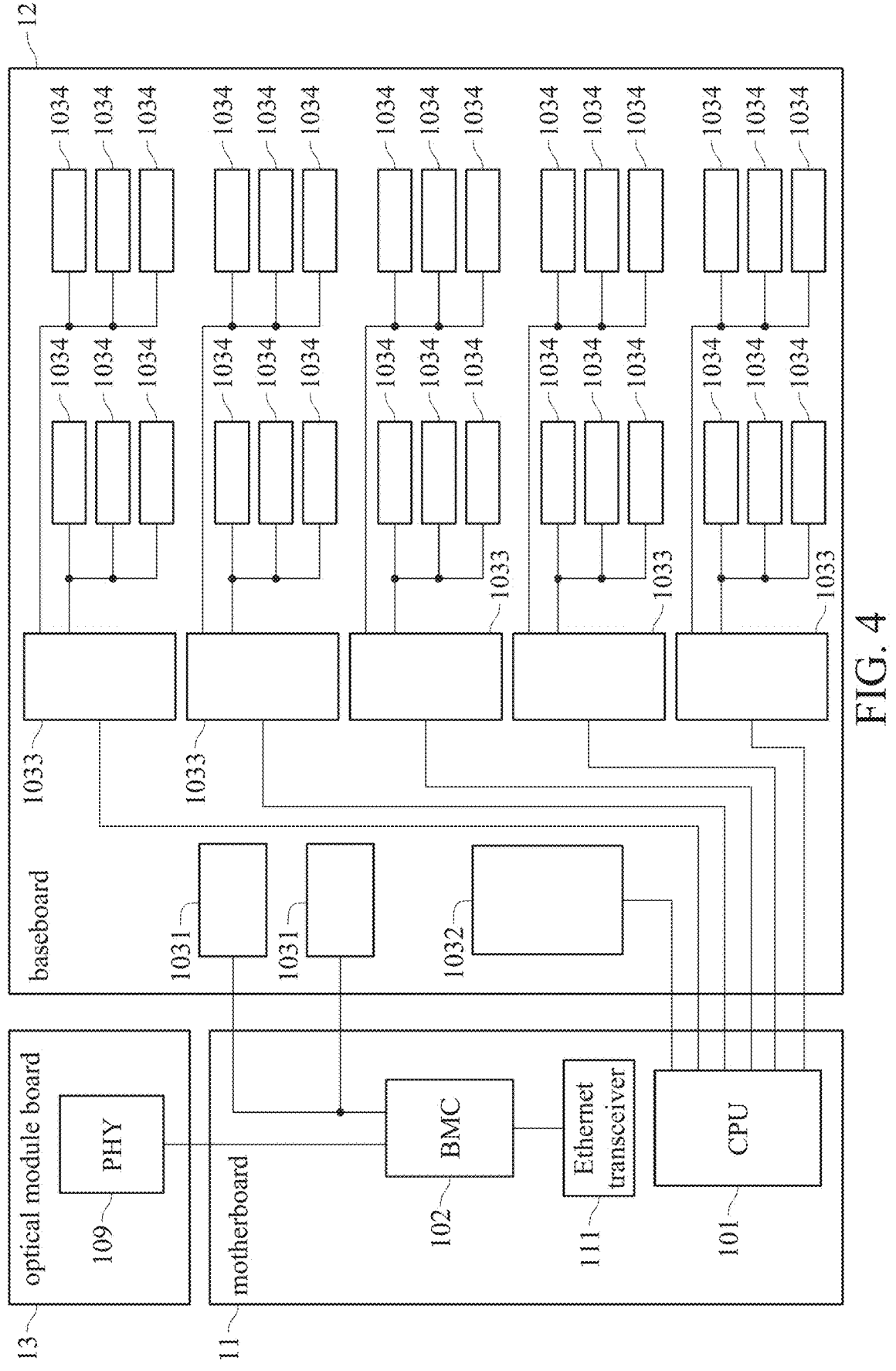
FIG. 4 is a schematic diagram of the management architecture of a data server system according to an embodiment of the present disclosure.

Please refer to FIG. 4 along with FIG. 1 and FIG. 2, FIG. 4 is a schematic diagram of the management architecture of a data server system according to an embodiment of the present disclosure. As shown in FIG. 4, the CPU 101 may be configured to manage the second transmission chip 1032 and the plurality of third transmission chips 1033, and each third transmission chip 1033 may be configured to manage the plurality of fourth transmission chips 1034. Specifically, the CPU 101 may manage the second transmission chips 1032 through four PCIe Gen3 ports, and manage five second transmission chips 1032 through five PCIe Gen3 ports respectively. The BMC 102 may be connected to an Ethernet transceiver 111 and is configured to manage the PHY chip 109 and the two first transmission chips 1031. Through this configuration, the BMC 102 may complete the initialization of two BCM81381 and BCM81358 through the MDC/MDIO interface, the CPU 101 may manage BCM56771 and five BCM56072 through the PCIe interface, and each BCM56072 may manage six BCM54908E through two MDC/MDIO interfaces.

Figure 5:
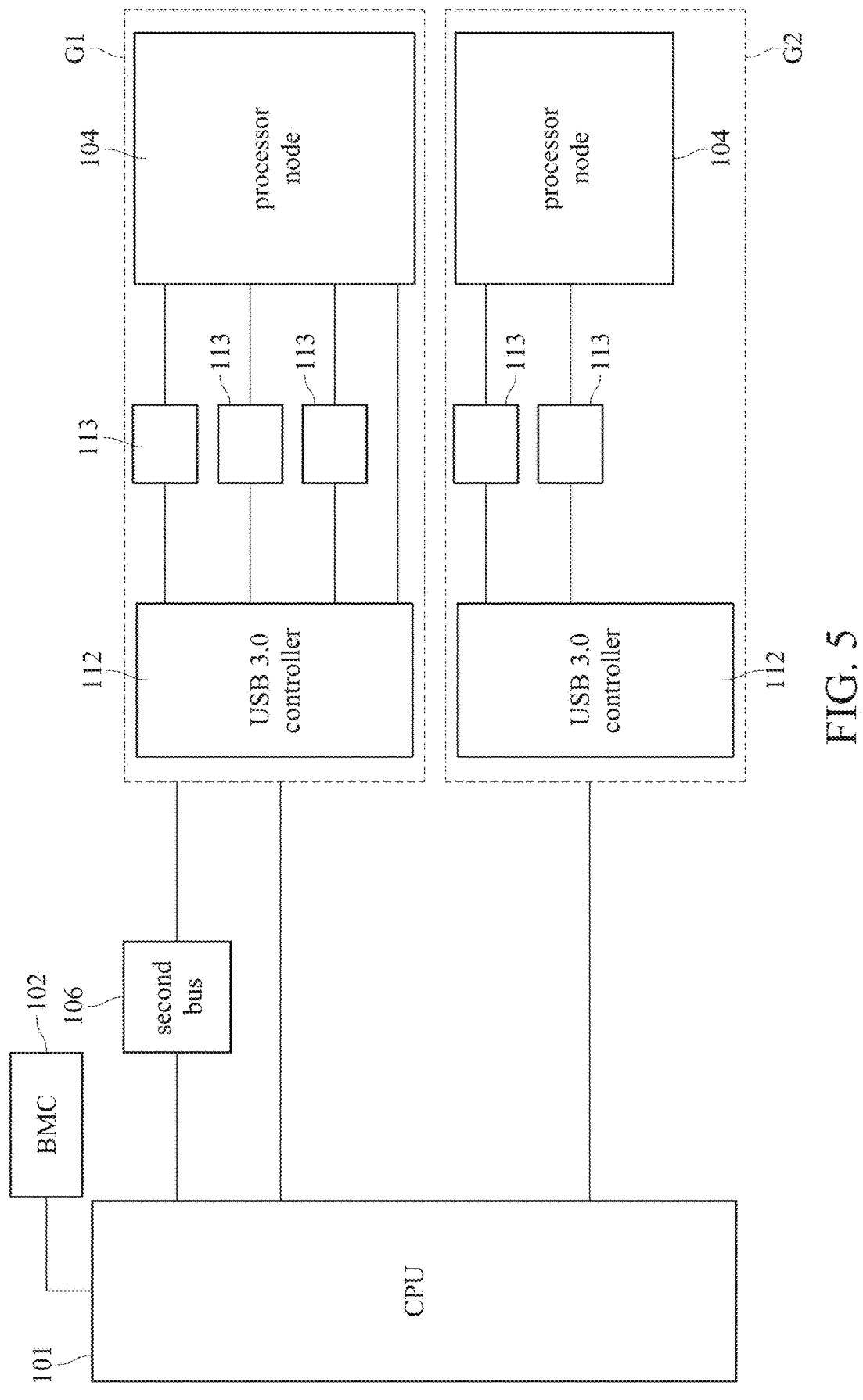
FIG. 5 is a schematic diagram of a USB topology design of a data server system according to another embodiment of the present disclosure.

Please refer to FIG. 5 along with FIG. 1, FIG. 5 is a schematic diagram of a USB topology design of a data server system according to another embodiment of the present disclosure. The data server system of the present embodiment may further include a plurality of universal serial buses (USB) connected between the second bus 106 and the processor nodes 104. As shown in FIG. 5, the CPU 101 may be connected to the second bus 106 through a PCIe2.0×4 interface. The second bus 106 may be connected to the four USB 3.0 controllers 112 of the first group G1 through four PCIe2.0×1 interfaces. The CPU 101 may be connected to eight USB 3.0 controllers 112 of the first group G1 through eight PCIe2.0×1 interfaces. That is, the CPU 101 may be connected to a total of twelve USB 3.0 controllers 112 of the first group G1. The CPU 101 may also be connected to a USB 3.0 controller 112 of the second group G2 through a PCIe2.0×1 interface. In each first group G1, the USB 3.0 controller 112 may be connected to three USB hubs 113 through three USB 3.0 interfaces respectively, and the three USB hubs 113 are connected to a total of eighteen processor nodes 104 through six USB 3.0 interfaces. In each first group G1, the USB 3.0 controller 112 may also be connected to one processor node 104 through one USB 3.0 interface. That is, in the first group G1, each USB 3.0 controller 112 may be connected to nineteen processor nodes 104.

In the second group G2, the USB 3.0 controller 112 may be connected to two USB hubs 113 through two USB 3.0 interfaces, and the two USB hubs 113 are connected to a total of twelve processor nodes 104 through 6 USB 3.0 interfaces respectively. That is, in the second group G2, each USB 3.0 controller 112 may be connected to twelve processor nodes 104. Under this architecture, the CPU 101 may be connected to 12×19+12=240 processor nodes 104 through the USB 3.0 controllers 112 of the first group G1 and the second group G2 through the universal serial bus. In addition, the CPU 101 may also be connected to the BMC 102 through a USB port, and has a spare USB port for connection by other devices.

Figure 6:
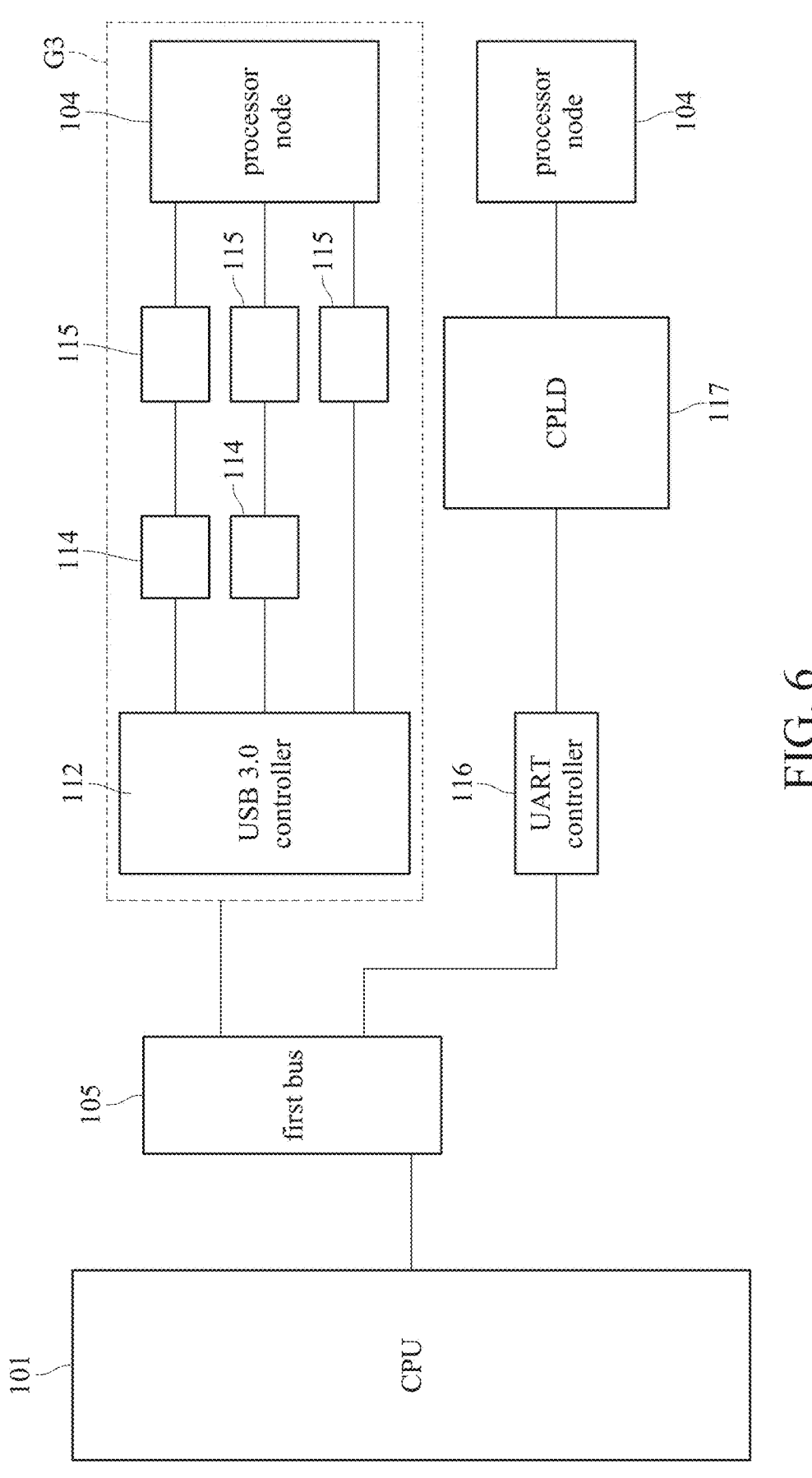
FIG. 6 is a schematic diagram of a UART topology design of a data server system according to another embodiment of the present disclosure.

Please refer to FIG. 6 which is a schematic diagram of a UART topology design of a data server system according to another embodiment of the present disclosure. The data server system in the present embodiment may further include a plurality of universal asynchronous transceivers connected between the first bus 105 and the plurality of processor nodes 104. These universal asynchronous transceivers include a plurality of main transmitters and a plurality of spare transmitters. As shown in FIG. 6, the CPU 101 may be connected to the first bus 105 through a PCIe2.0×1 interface. The first bus 105 may be connected to four USB 3.0 controllers 112 of the third group G3 through four PCIe2.0×1 interfaces. That is, the CPU 101 may be connected to a total of four USB 3.0 controllers 112 of the third group G3. In each third group G3, the USB 3.0 controller 112 may be connected to two USB 2.0 controllers 114 respectively through two USB 2.0 interfaces, and the four USB 2.0 controllers 114 are respectively connected to the seven USB interface chips 115 through the seven USB 2.0 interfaces. Each USB interface chip 115 may be connected to four processor nodes 104 through a UART port. In each third group G3, the USB 3.0 controller 112 may also be connected to a USB interface chip 115 through a USB 2.0 interface to connect to the four processor nodes 104 through the UART port. That is, in the third group G3, each USB 3.0 controller 112 may be connected to 4×7×2+4=60 processor nodes 104. In addition, the first bus 105 may also be connected to the UART controller 116 through one PCIe1.0×1 interface. The UART controller 116 may be connected to a Complex Programmable Logic Device (CPLD) 117 through eight UART ports. The CPLD 117 may be connected to the two hundred forty processor nodes 104 through two hundred forty UART ports to serve as a spare transmitter.

For example, the USB 3.0 controller of the present embodiment may be implemented using the UPD720201 chip from Renesas Corporation. The USB hub 113 may be implemented using the USB5806 chip from Microchip Corporation. The USB 2.0 controller 114 can be implemented using the USB2517 chip from Microchip Corporation. The USB interface chip 115 may be implemented using the FT4232 chip from FTDI Corporation. The UART controller 116 may be implemented using the XR17V358 chip from MAXLinear Corporation. However, the present disclosure is not limited to using the above components. Through the configuration of this embodiment, the data server system may support two frontend USB3.0 interfaces, and a USB2.0 interface is reserved between the CPU and the BMC for communication. This system provides two hundred forty USB3.0 channels to realize firmware upgrade of QCS8550 in each node through USB3.0. In the present embodiment, the PCIe port of the CPU is allocated and expanded to thirteen PCIe2.0 channels through the PCIe Switch PI7C9×2 G608GP, and then the USB controller uPD720201 is used with a USB hub to expand two hundred forty USB3.0 channels. Due to the Limitation of the number of slots and terminals supported by uPD720201, one uPD720201 may be expanded to nineteen USB3.0, so the present embodiment uses a combination scheme of twelve groups of 1×uPD720201+3×USB5806, plus a combination scheme of one group of 1×uPD720201+2×USB5806, to meet the 240-channel USB3.0 requirement in this system.

Through the configuration of this embodiment, the system supports two UARTs to each node, one is the main UART and the other is the backup UART. In the present embodiment, one channel of X1 PCIe2.0 of the CPU is allocated and expanded to 5 channels of PCIe through the PCIe switch PI7C9×2 G608GP, of which four channels are expanded to two hundred forty channels of main UART through the PCIe-to-USB and USB-to-UART adapters. This embodiment may be implemented with four groups of 1×uPD720201+2×USB2517+7×FT4232; the other PCIe is converted into 8-channel URAT through XR17V358, and then CPLD is used to implement the expansion and switching of 240-channel backup UART.

Please refer to the following description for PCIe allocation. The network switch BCM56771 occupies one PCIe3.0×4, and five BCM56072 occupies five PCIe3.0×1. UART: PCIe2.0×1 expands four PCIe2.0×1 through the switch to connect four USB controllers for USB-UART conversion chip+expands one PCIe2.0×1 to connect PCIe-UART controller. USB: PCIe2.0×4 expands four PCIe2.0×1 through the switch to connect four USB controllers+HSIO leads to nine PCIe2.0×1 connected to nine USB controllers, in a total number of 13. BMC: PCIe2.0×1, two USB3.0×1 and two M.2 SATA.

This system also supports the architecture of four power supplies (2+2), and the system power distribution board (PDB) supplies power to each board. The PDB supplies power to the baseboard through four 2×12 power connectors; the PDB supplies power to the optical module board through one 2×2 power connector; the baseboard supplies power to the motherboard through one 2×2 power connector.

In view of the above description, the data server system of the present disclosure receives and transmits a large amount of data through optical transceivers, and uses the Ethernet switch and the first and second buses as the data transmission interface between the CPU and the processor nodes. The data server system can improve the data storage density and data processing ability of the server, and allow users to instantly enjoy the big data services of the online short video platform and online gaming platform. In addition, this system supports the conversion of two hundred forty nodes of PCIe to 2.5 G Base-T, and converges them into two 100 G uplink ports through the system's network to realize audio and video transcoding and gaming data transmission. The system supports 240 main UARTs for individual node control and management, and also supports 240 backup UARTs as a backup design, which may improve the reliability of system management. The system supports frontend 100 G dual uplink function. The system supports PXE function, switches through BMC, and supports transparent and connected switch chip forwarding modes. Each POD card is equipped with 4 nodes, which may save the maintenance cost of bad cards and supports hot-plugging, and through the golden finger mechanism design and related line protection mechanisms, online hot-plugging operation mode may be supported.

What is claimed is:

1. A data server system, comprising:
   a motherboard;
   a central processing unit (CPU) disposed on the motherboard;

a baseboard management controller (BMC) disposed on the motherboard and connected to the CPU;
   a baseboard;
   an Ethernet switch disposed on the baseboard and connected to the CPU and the BMC;
   a plurality of processor nodes disposed on the baseboard and connected to the Ethernet switch and the CPU;
   a first bus and a second bus disposed on the baseboard and connected to the CPU and the plurality of processor nodes;
   a set of first optical transceivers disposed on the baseboard and connected to the Ethernet switch;
   an optical module board;
   a set of second optical transceivers disposed on the optical module board and connected to the set of first optical transceivers;
   a physical layer (PHY) chip disposed on the optical module board and connected to the second optical transceivers; and
   a set of third optical transceivers disposed on the optical module board and connected to the PHY chip.

2. The data server system of claim 1, wherein the Ethernet switch comprises two first transmission chips, a second transmission chip, a plurality of third transmission chips and a plurality of fourth transmission chips, the two first transmission chips are connected to the set of first optical transceivers, the second transmission chip is connected to the two first transmission chips, the plurality of third transmission chips are connected to the second transmission chip, and the plurality of fourth transmission chips are connected to the plurality of third transmission chips and the plurality of processor nodes.

3. The data server system of claim 2, wherein a number of the plurality of processor nodes is 240, a number of the plurality of third transmission chips is 5, and a number of the plurality of fourth transmission chips is 30.

4. The data server system of claim 2, wherein the two first transmission chips support 100 G data transmission rate, and are configured to be switched to a first mode or a second mode under control of the BMC, in the first mode, the CPU directly receives a signal from the set of first optical transceivers through the two first transmission chips, and in the second mode, the CPU receives a signal from the set of first optical transceivers through the two first transmission chips and the second transmission chip.

5. The data server system of claim 2, wherein the CPU is configured to manage the second transmission chip and the plurality of third transmission chips, and the plurality of third transmission chip are configured to manage the plurality of fourth transmission chips.

6. The data server system of claim 1, further comprising a plurality of adapting components, wherein the plurality of adapting components are connected to the plurality of processor nodes through Base-T ports and connected to the Ethernet switch through PCIe ports.

7. The data server system of claim 1, further comprising a plurality of universal serial buses (USB) connected between the second bus and the plurality of processor nodes.

8. The data server system of claim 1, further comprising a plurality of universal asynchronous transceivers connected between the first bus and the plurality of processor nodes, wherein the plurality of universal asynchronous transceivers comprise a plurality of main transmitters and a plurality of spare transmitters.

9. The data server system of claim 1, wherein the third optical transceiver comprises a Dual Small Form-factor Pluggable (DSFP) port and a Quad Small Form-factor Pluggable (QSFP) port.

10. The data server system of claim 1, wherein a number of the plurality of processor nodes is 240, and every four of the plurality of processor nodes are disposed on a computing card (POD card), and each of the POD card supports hot-plugging function.

\* \* \* \* \*